(12) United States Patent
Lee

(10) Patent No.: US 8,169,448 B2
(45) Date of Patent: May 1, 2012

(54) MOBILE TERMINAL AND DISPLAY METHOD THEREOF

(75) Inventor: Chang-On Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 613 days.

(21) Appl. No.: 12/369,636

(22) Filed: Feb. 11, 2009

(65) Prior Publication Data

US 2009/0231244 A1     Sep. 17, 2009

(30) Foreign Application Priority Data

Mar. 11, 2008    (KR) .................. 10-2008-0022603

(51) Int. Cl.
*G09G 5/00*     (2006.01)

(52) U.S. Cl. .......................................... 345/619; 345/76

(58) Field of Classification Search .................. None
See application file for complete search history.

(56) References Cited

U.S. PATENT DOCUMENTS

| | | |
|---|---|---|
| 2003/0103091 A1 | 6/2003 | Wong et al. |
| 2005/0024319 A1 | 2/2005 | Amirzadeh et al. |
| 2005/0046768 A1* | 3/2005 | Wu ................................. 349/65 |
| 2007/0188450 A1 | 8/2007 | Hernandez et al. |

FOREIGN PATENT DOCUMENTS

EP     1843563     10/2007

* cited by examiner

*Primary Examiner* — Paul Huber

(74) *Attorney, Agent, or Firm* — Lee, Hong, Degerman, Kang & Waimey

(57) ABSTRACT

A display unit includes a transparent light emitting element and displaying information on both sides thereof; a sensing unit for detecting the direction in which the screen of the display unit faces; and a controller for determining a placed state of the display unit according to the detected screen direction and changing information displayed on the display unit according to the determined placed state of the display unit. The screen direction may be one of a first direction in which a front surface of the display unit faces upward, and a second direction in which a rear surface of the display unit faces upward. By using the transparent display device, information can be displayed by using both surfaces of the display device, and displayed information can be changed according to a placed state of the display device. Thus, the users' interest and fun can be aroused and user convenience can be provided.

12 Claims, 8 Drawing Sheets

MOBILE TERMINAL AND DISPLAY METHOD THEREOF

CROSS REFERENCE TO RELATED APPLICATIONS

The present application claims priority to Korean Application No. 10-2008-0022603 filed in Korea on Mar. 11, 2008, the entire contents of which is hereby incorporated by reference in its entirety.

BACKGROUND OF THE INVENTION

1. Field of the Invention

The present invention relates to a mobile terminal for changing displayed information according to a placed state of a display unit.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

In general, the display device of a mobile terminal is implemented as a liquid crystal display, a thin film transistor liquid crystal display, an organic light emitting diode, or the like. The mobile terminal displays various information generated according to the operation of the terminal through one surface of the display device.

SUMMARY OF THE INVENTION

Accordingly, one object of the present invention is to address the above-noted and other problems.

Another object of the present invention is to provide a mobile terminal for changing displayed information according to a placed state of a display device.

To achieve these and other advantages and in accordance with the purpose of the present invention, as embodied and broadly described herein, the present invention provides in one aspect a mobile terminal including: a display unit including a transparent light emitting element and displaying information on both sides thereof; a sensing unit for detecting the direction in which the screen of the display unit faces; and a controller for determining a placed state of the display unit according to the detected screen direction and changing information displayed on the display unit according to the determined placed state of the display unit.

The screen direction may be one of a first direction in which a front surface of the display unit faces upward, and a second direction in which a rear surface of the display unit faces upward.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
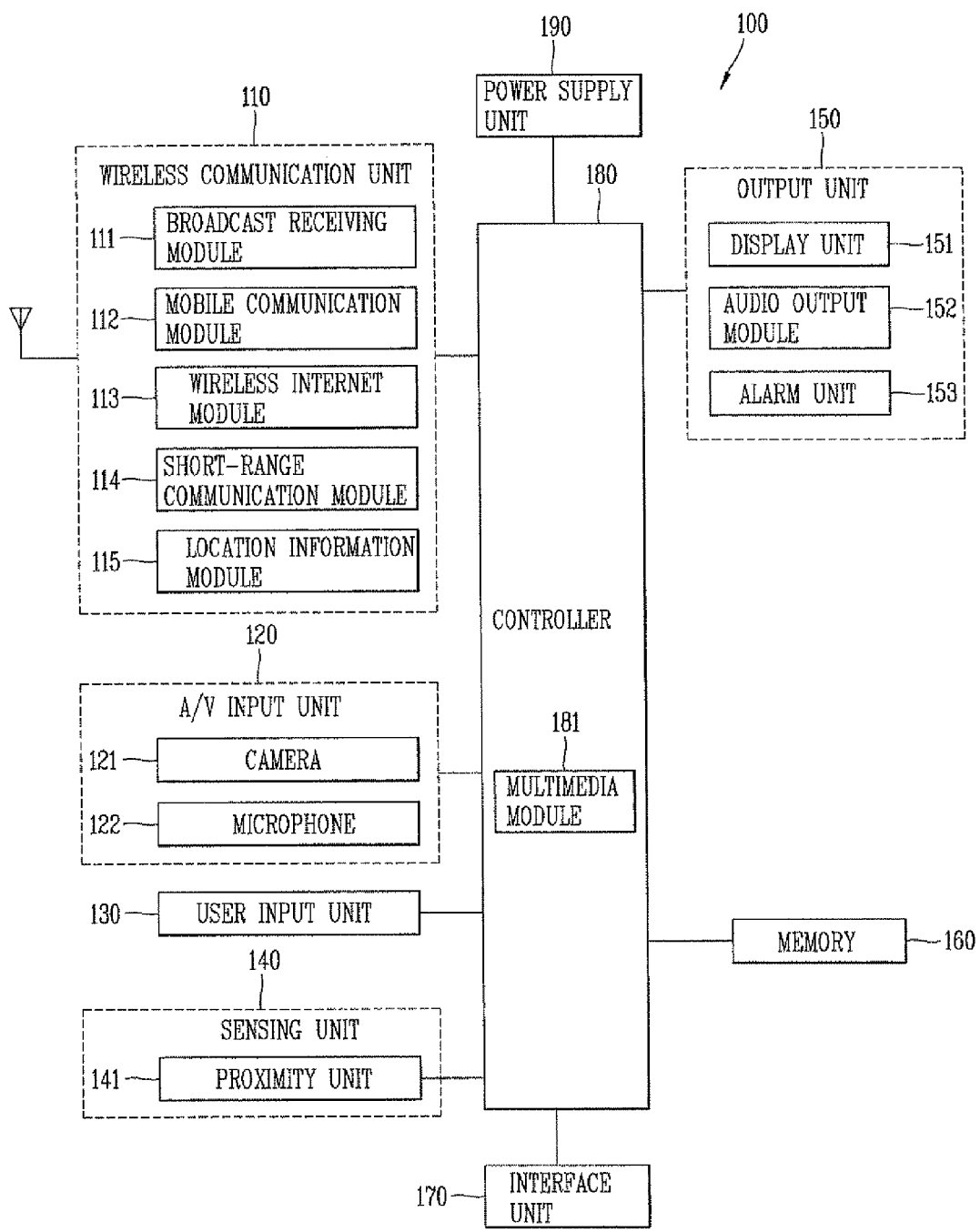
FIG. 1 is a schematic block diagram of a mobile terminal implementing an embodiment of the present invention.

FIG. 1 is a block diagram of a mobile terminal according to an embodiment of the present invention.

The mobile terminal according to an embodiment of the present invention will now be described with reference to FIG. 1.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc.

FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the user touches the touch screen with his finger tip in a flicking manner to perform an operation of quickly moving a select menu (or a selection bar) or a cursor displayed thereon the sensing unit 140 may sense the user's manipulation to generate a corresponding sense signal.

Also, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be described in association with the touch screen.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority to use the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit o allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit and an internal display unit.

The touch screen may be configured to detect a touch input pressure as well as a touch input position and a touch input area. The touch screen may detect a user's touch and manipulation such as dragging, scrolling, flicking, or the like by interworking with the sensing unit 140.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user. Thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. In addition, the memory 160 may store data regarding various patterns of vibrations and audio signals to be outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3.

The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
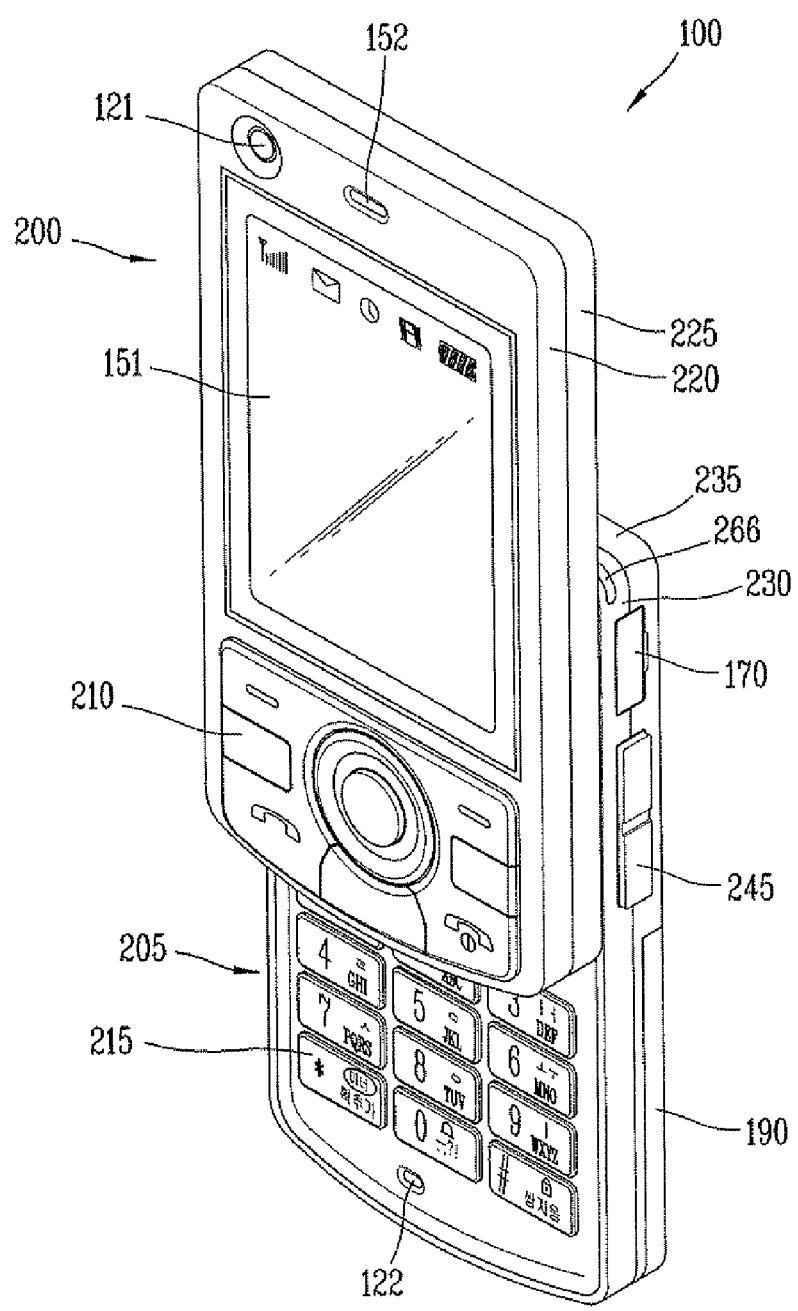
FIG. 2 is a front perspective view of a mobile terminal implementing an embodiment of the present invention.

FIG. 2 is a front perspective view of the mobile terminal according to an embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body is disposed to overlap with the second body 205 may be called a closed configuration, and as shown in FIG. 2, a state in which at least a portion of the second body 205 is exposed may be called an open configuration.

Although not shown, the mobile terminal according to the present invention may be the folder type mobile terminal including the first body and the second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily know by the person in the art without any explanation, so its detailed description will be omitted.

In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body, 200, specifically, on the first front case 220 of the first body 200.

The display unit 151 may include an LCD (Liquid Crystal Display), an OLED (Organic Light Emitting Diode), and the like, that visually displays information.

A touch pad may be overlaid in a layered manner on the display unit 151 to allow the display unit 151 to function as a touch screen to input information via user gestures or touch inputs.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. For example, the interface unit 170 may be implemented in the form of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like.

Also, the interface unit 170 may be a card socket for accommodating a SIM (Subscriber Identification Module) card or a UIM (User Identity Module) card, or an external card such as a memory card for storing information.

The power supply unit 190 for supplying power to the terminal may be located at the second rear case 235.

The power supply unit 190 may be, for example, a rechargeable battery that can be detached.

Figure 3:
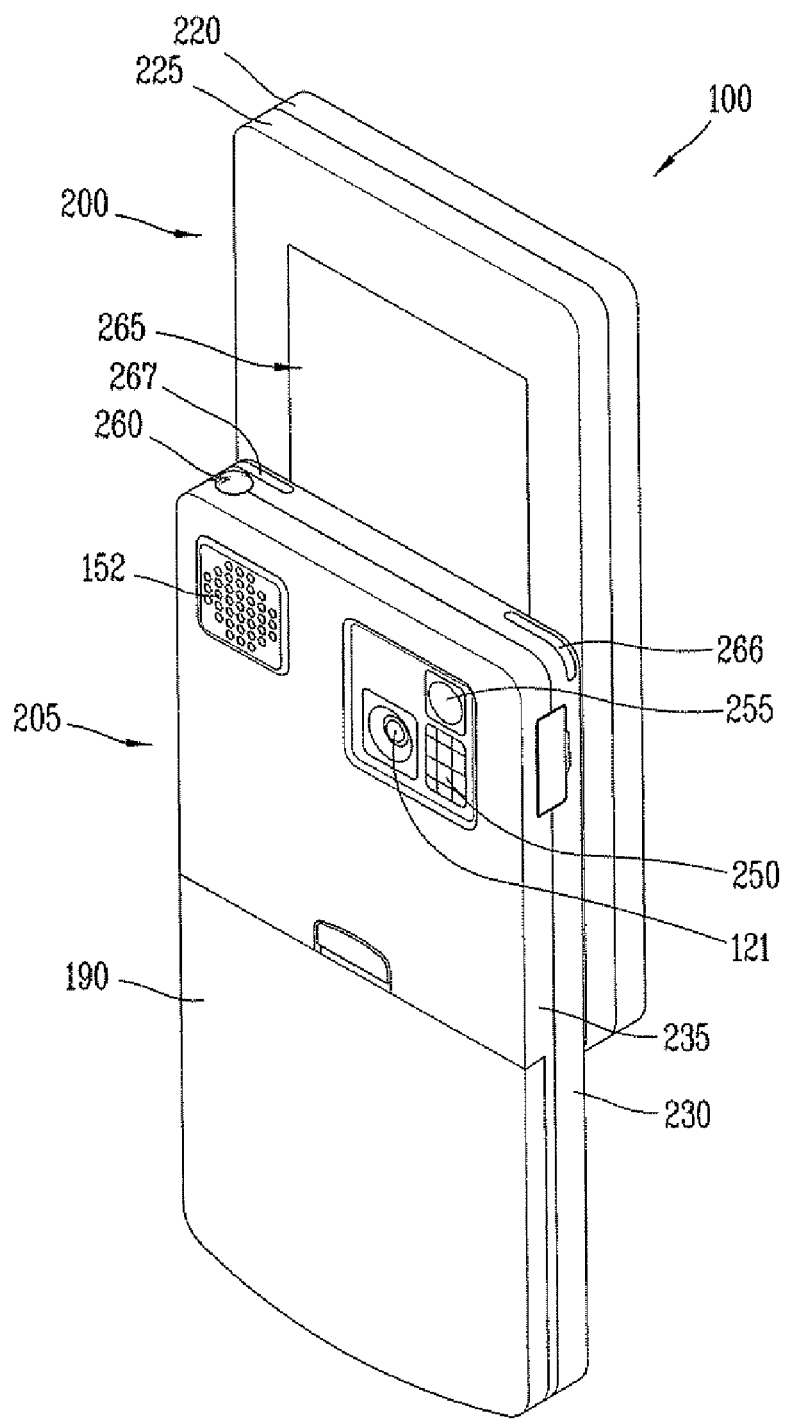
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing, The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
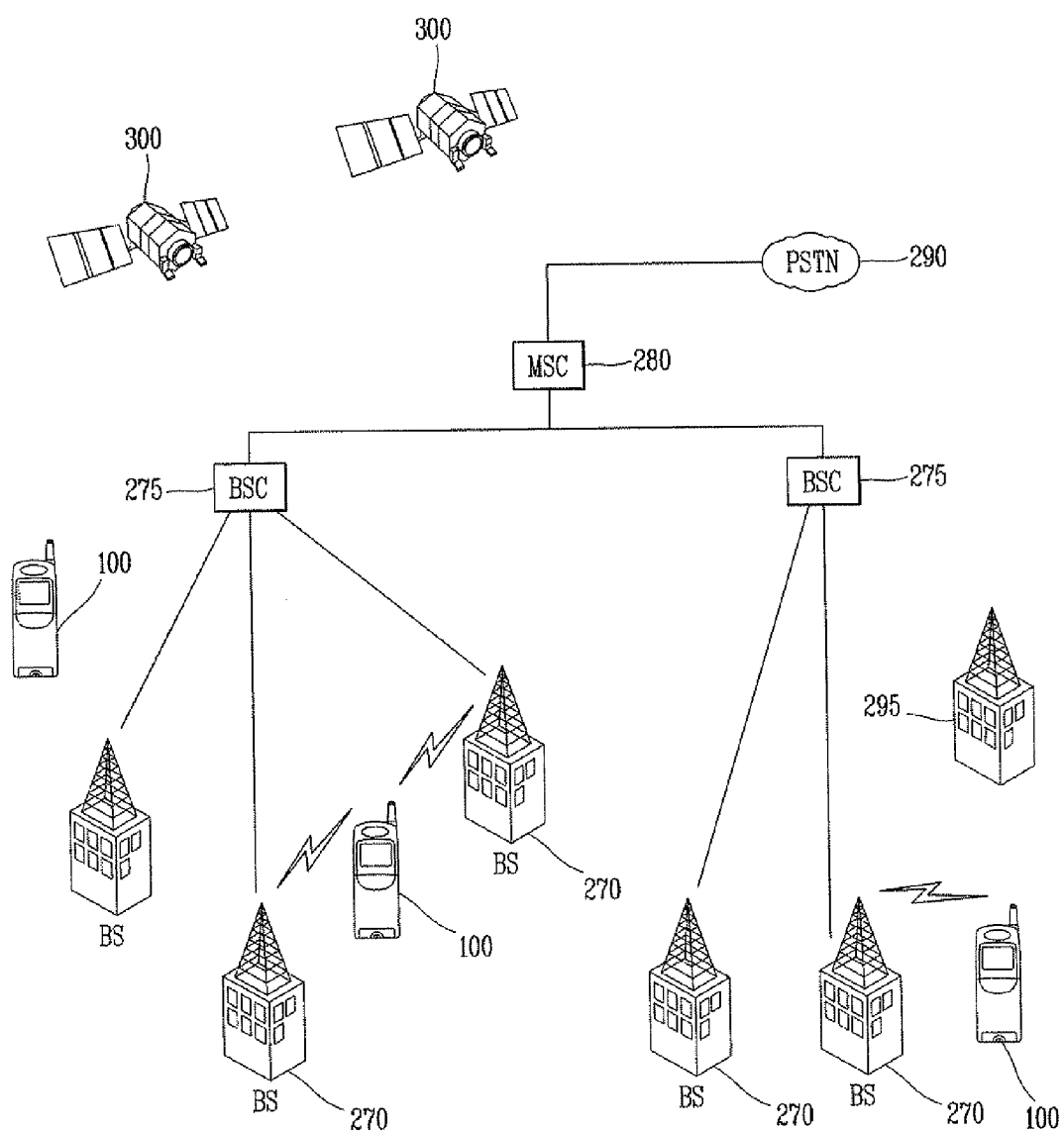
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100.

In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information.

Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270.

The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Hereinafter, a method for changing information displayed on the display screen according to a placed state of the mobile terminal according to an embodiment of the present invention will now be described in detail.

The mobile terminal 100 according to the present invention includes the sensing unit 140 that detects a placed state of the display unit 151. The sensing unit 140 detects the direction of the screen of the display unit 151 and generates a sense signal for controlling the operation of the mobile terminal 100. The screen direction may be one of a first direction in which a front surface of the display unit 151 faces upward, and a second direction in which a rear surface of the display unit 151 faces upward. The sensing unit 140 may be implemented as a sensor for measuring the orientation and rotational direction such as an earth axis sensor, a terrestrial magnetic sensor, or the like.

When the display unit 151 is implemented to be independently rotated, the sensing unit 140 may be mounted at the display unit 151 and detect the screen direction of the display unit 151 that changes according to a rotation. Or, when the display unit 151 is implemented such that it cannot be independently rotated like in the bar-type mobile terminal 100, the sensing unit 140 may be mounted within the mobile terminal 100 and detect the orientation and rotational state of the mobile terminal 100 to thus detect the screen direction of the display unit 151.

The display unit 151 displays the state and results according to the operation of the mobile terminal 100 and may be configured as a touch screen by forming a layered structure together with a touch pad. Accordingly, the display unit 151 may also serve as an input device as well as the display device.

Figure 5:
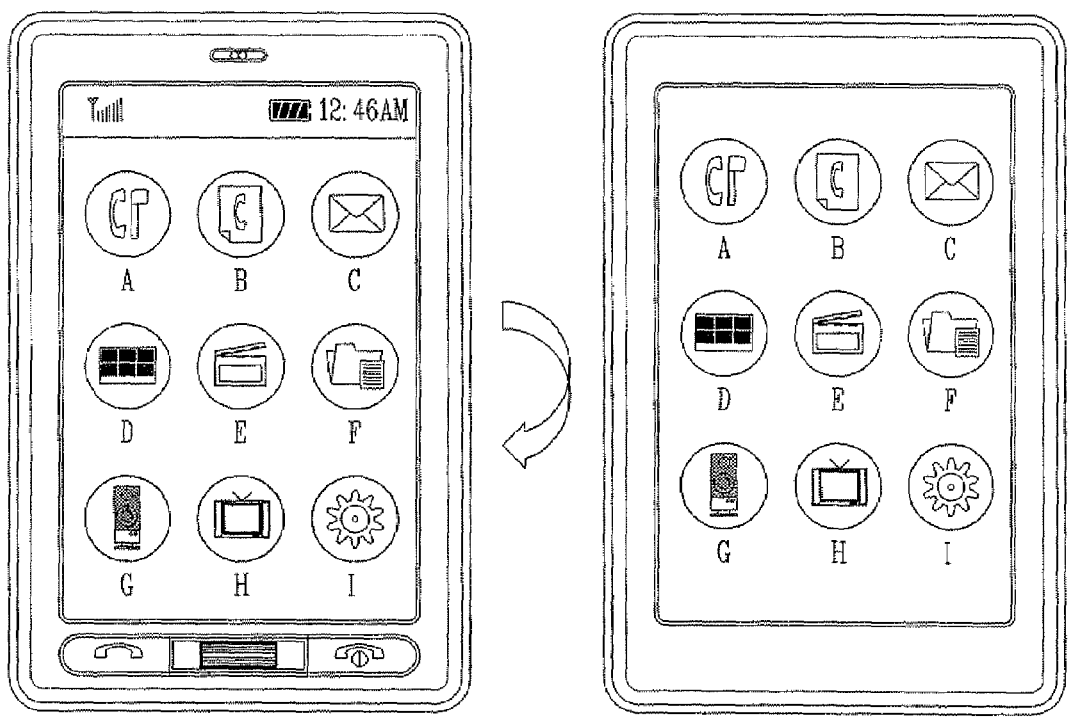
FIG. 5 is an overview of a display screen illustrating information on a display device of the mobile terminal according to an embodiment of the present invention.

In addition, the display unit 151 may be configured as an element having the characteristics that it is transparent when light is not emitted, and emits light from both sides. Accordingly, the display unit 151 may be implemented to have a certain transparency, so the mobile terminal can display particular information through the front surface and the rear surface of the display unit 151 as shown in FIG. 5.

In addition, the display unit 151 may be configured such that two display devices are overlaid to display information on both surfaces. Here, the touch pad may have a mutual layered structure on both surfaces of the display unit 151 so as to be implemented as a touch screen allowing both-side touch inputting.

The memory 160 stores a general program and various data for controlling the operation of the mobile terminal 100. The memory 160 stores various setting information and data generated when the mobile terminal 100 is operated.

In addition, the memory 160 may store a lookup table for determining a placed state of the display unit 151 according to the screen direction of the display unit 151 detected through the sensing unit 140.

The controller 180 controls the operation of the mobile terminal 100 by controlling the elements. The controller 180 determines a placed state of the display unit 151 according to the sense signal received from the sensing unit 140. The controller 180 changes information currently displayed on the display unit 151 to different information or to a setting screen image. At this time, the controller provides control to display information, currently displayed on the display unit 151, such that it is displayed in a forward direction according to a placed state of the display unit 151.

For example, when the display unit 151 is rotated with particular information displayed on its front surface, the sensing unit 140 detects the placed state of the changed display unit 151 and informs the controller 180 accordingly. The controller 180 displays different information corresponding to the placed state of the changed display unit 151 according to the sense signal from the sensing unit 140, on the display unit 151. And, the controller 180 provides control to display the different information such that it is displayed in a forward direction on the display unit 151.

When another surface of the display unit 151 faces in the opposite direction of the ground according to a rotation of the display unit 151 in a state that information is displayed on one surface of the display unit 151, the controller may change the information displayed on one surface of the display unit 151 to its related different information and display it on another surface of the display unit 151.

For example, in a state that one surface of the display unit 151 faces in a direction perpendicular to the ground and displays a photo image on one surface of the display unit 151, when the display unit 151 is rotated so its placed state is changed, the sensing unit 140 detects it. When the sensing unit 140 detects that the display unit 151 is placed such that another surface thereof is perpendicular to the ground, the controller displays detailed information about the photo image displayed on one surface of the display unit 151, on another surface of the display unit 151.

Figure 6:
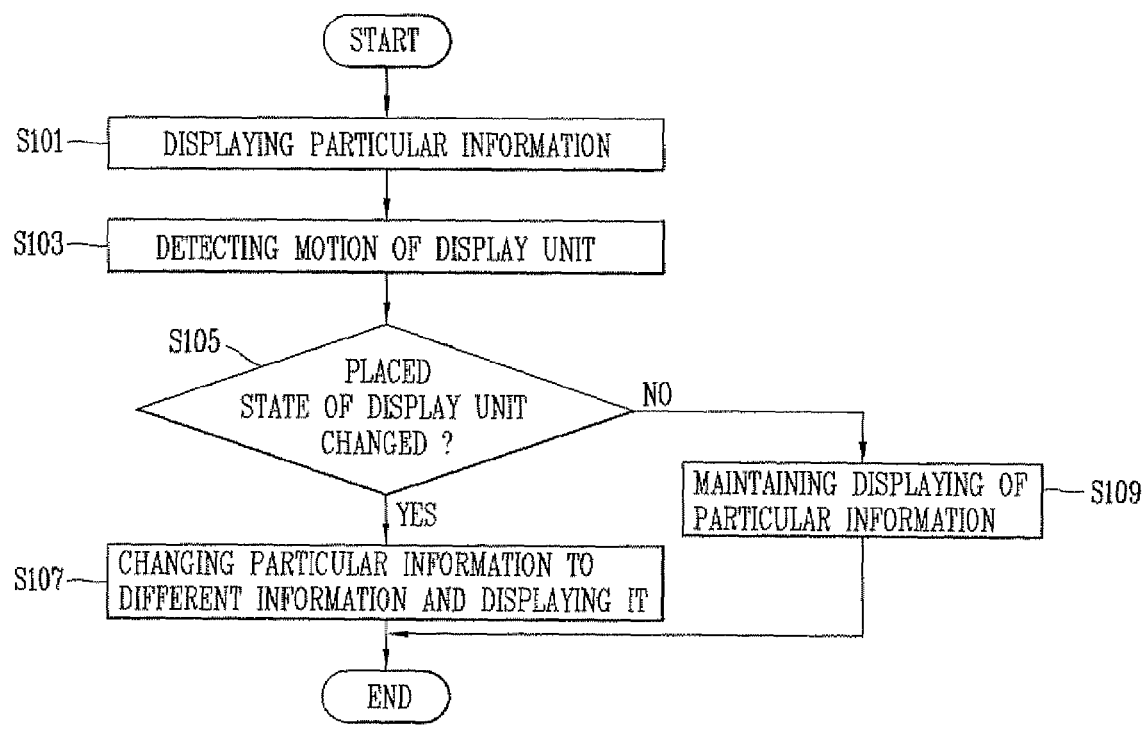
FIG. 6 is a flow chart illustrating a display method of the mobile terminal according to an embodiment of the present invention.

FIG. 6 is a flow chart illustrating a display method of the mobile terminal according to an embodiment of the present invention. In the present embodiment, the mobile terminal includes a transparent display device and displays information on both surfaces of the display device.

With reference to FIG. 6, in the mobile terminal 100, when the user manipulates the display unit 151 in a state that particular information is displayed on the front surface of the display unit 151, the sensing unit 140 detects the direction of the screen, namely, the direction in which the screen faces (S101, S103). In other words, in a state that the front surface of the display unit 151 faces in the opposite direction of the ground and displays particular information, when the display unit 151 is rotated such that its front surface faces the ground, the sensing unit 140 detects it and informs the controller 180 accordingly. Namely, when the rear surface of the display unit 151 faces in the opposite direction of the ground, the sensing unit 140 detects it and informs the controller 180 accordingly.

Upon detecting the screen direction of the display unit 151 via the sensing unit 140, the controller 180 discriminates the placed state of the display unit 151 according to the detected screen direction, and determines whether or not the placed state of the display unit 151 has been changed (S105). In other words, the controller 180 determines whether or not the screen of the display unit 151 has been reversed via the sensing unit 140. For example, in a state that the front surface of the display unit 151 faces upward, when the display unit 151 is manipulated such that the rear surface of the display unit 151 faces upward, the sensing unit 140 detects it and informs the controller 180 accordingly.

Upon determination, if the placed state of the display unit 151 has been changed, the controller 180 changes the information displayed on the display unit 151 and displays the changed information.

Meanwhile, if the placed state of the display unit 151 has not been changed, the controller 180 controls the display unit 151 to maintain the information displayed on the display unit 151 as it is.

Figure 7:
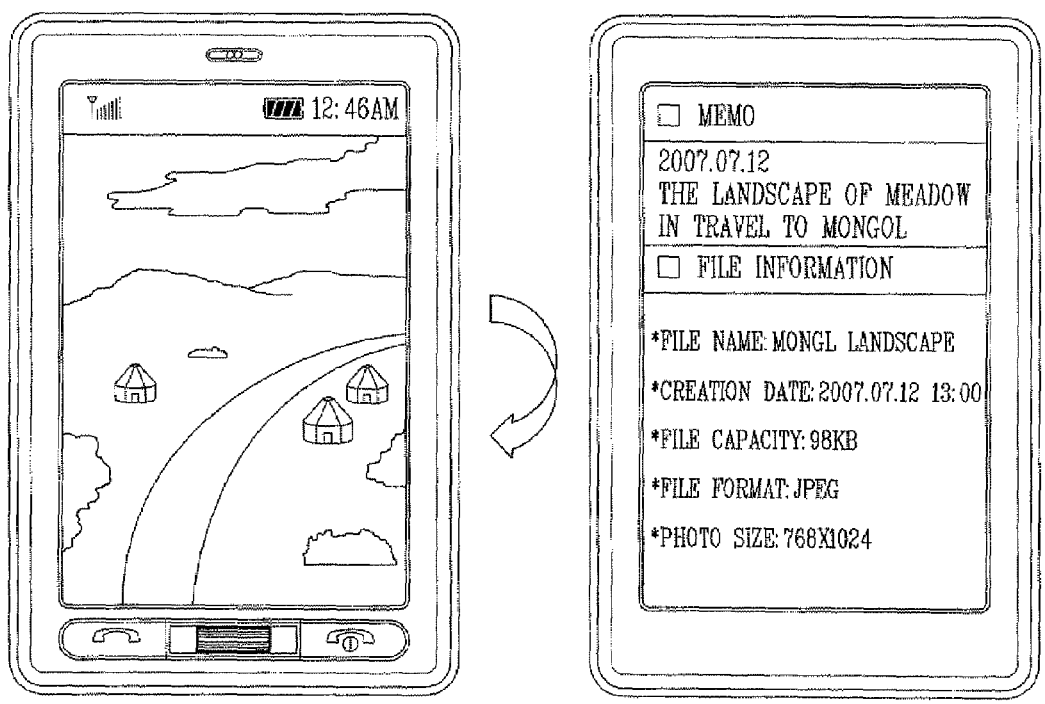
FIGS. 7 to 10 are overviews of display screens illustrating changing and displaying information in the mobile terminal according to an embodiment of the present invention.

FIG. 7 is an overview of display screens illustrating changing and displaying information in the mobile terminal according to an embodiment of the present invention. In this embodiment, a case where a photo image is displayed is taken as an example.

When the user instructs execution of a 'photo album' function via the user input unit 130, the controller 180 executes the 'photo album' function and displays a photo list on the display unit 151. When one of photos on the photo list displayed on the display unit 151 is selected by the user, the controller 180 of the mobile terminal displays the selected photo on the front surface of the display unit 151 as shown in FIG. 7.

Thereafter, when the user manipulates the display unit 151 to rotate it such that the rear surface of the display unit 151 faces upward, the sensing unit 140 detects it and generates a sense signal. Upon receiving the sense signal, the controller 180 recognizes that the display unit 151 has been reversed and changes the photo displayed on the display unit 151 to photo information about the corresponding photo and displays it. Here, the photo information may include a memo, a file capacity, a file name, a creation date, a file format, a photo size, or the like.

Figure 8:
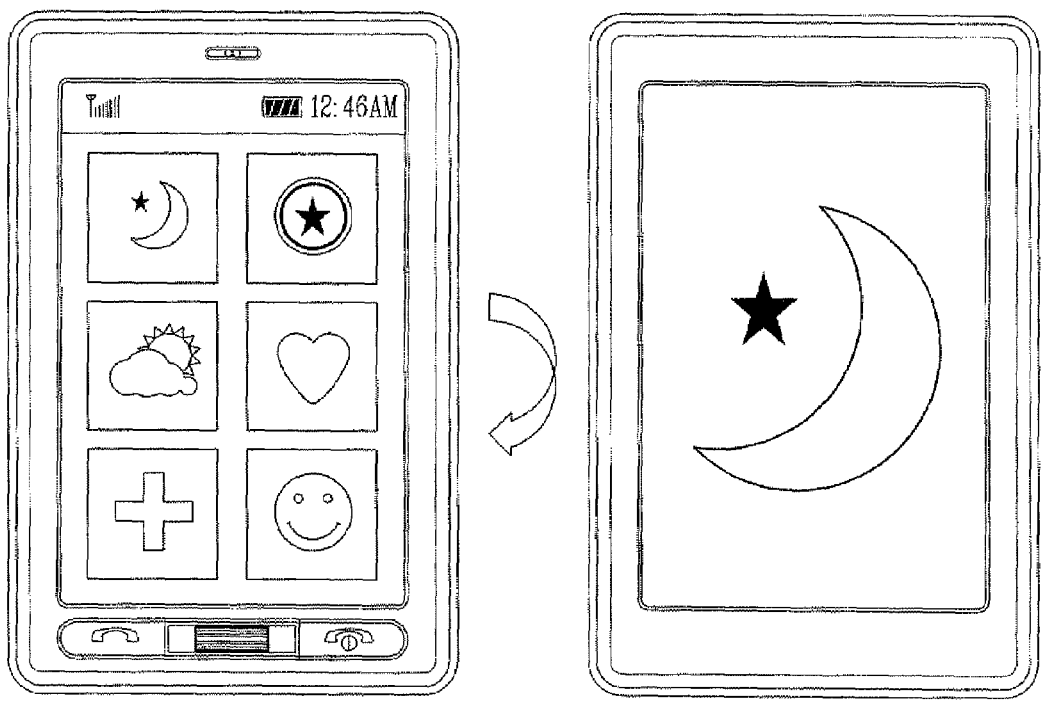

FIG. 8 is an overview of display screens illustrating changing and display information in the mobile terminal according to another embodiment of the present invention. In this embodiment, a case where a photo list is displayed is taken as an example.

When the user executes the 'photo album' function by manipulating the user input unit 130, the controller 180 displays a photo list as shown in FIG. 8. At this time, when the user rotates the mobile terminal 100, the sensing unit 140 detects it and informs the controller 180 accordingly. The controller 180 recognizes that the display unit 151 has been reversed via the sensing unit 140 and sequentially displays photos on the photo list on the display unit 151 in the certain order.

Alternatively, the controller may display the photos in the form of a slide show, or when one or more photos on the photo list displayed on the display unit 151 are selected, the controller 180 may display the selected photos according to the certain order on the display unit 151.

Figure 9:
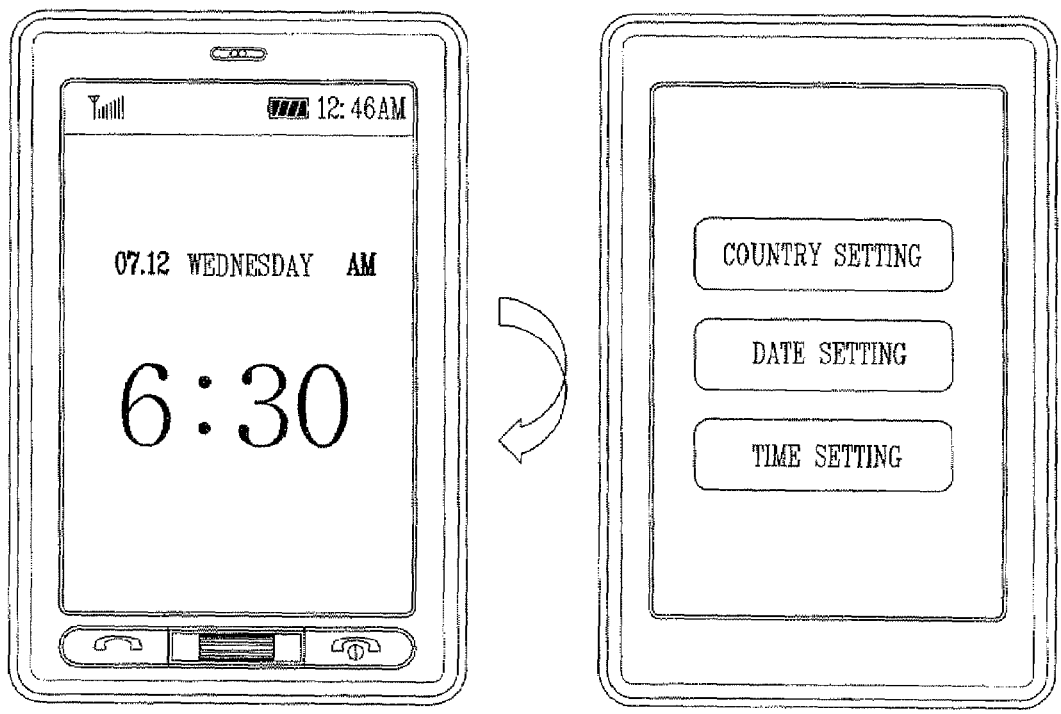

FIG. 9 is an overview of display screens illustrating changing and displaying information in the mobile terminal according to still another embodiment of the present invention. In this embodiment, a case where a clock is displayed as a standby screen image.

As shown in FIG. 9, when a rotation of the display unit 151 is detected in a state that a clock is displayed as a standby screen image, the controller 180 displays a setting environment so that information displayed on the display unit 151 may be set as clock information.

For example, as shown in FIG. 9, the mobile terminal 100 provides a setting environment allowing setting of a country, date, time, or the like. Besides, the mobile terminal 100 may be implemented to provide a setting environment allowing performing of setting an alarm or a wake-up call.

Thereafter, the user may set a world time, a current time, alarm, or the like, via the user input unit 130. When the display unit 151 is implemented as a touch screen allowing both-side touch inputting, clock information may be set through a touch input.

Figure 10:
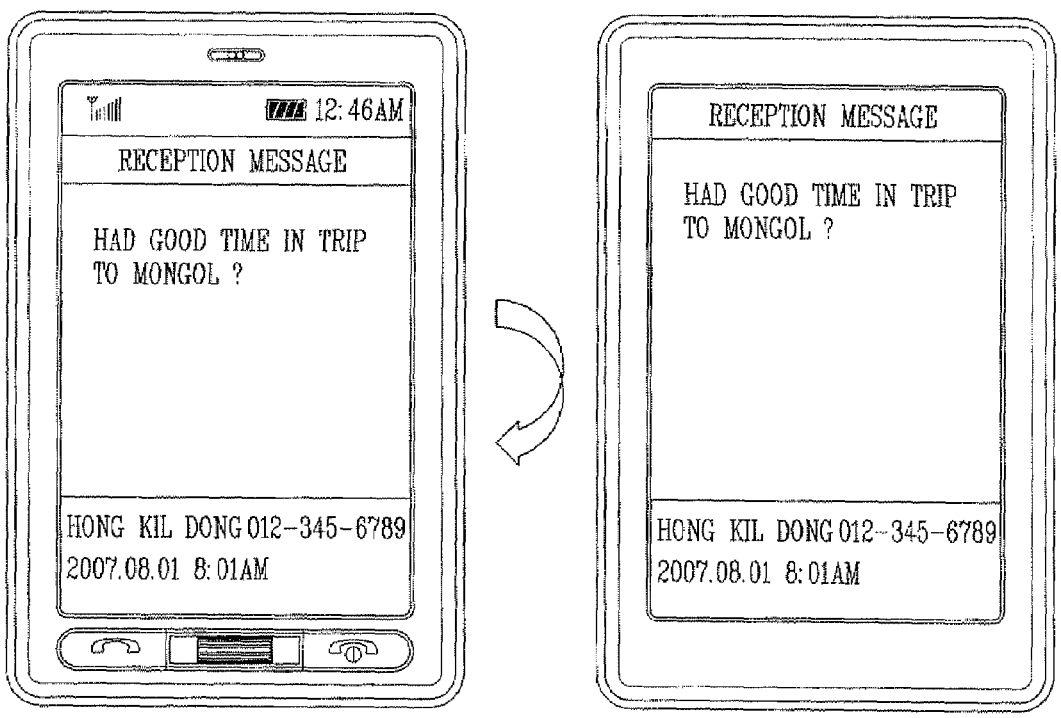

FIG. 10 is an overview of display screens illustrating changing and displaying information in the mobile terminal according to yet another embodiment of the present invention. In this embodiment, a case of checking a message is taken as an example.

When the user checks a received message through a menu manipulation, the controller 180 executes a 'reception message' menu according to input data generated from the user input unit 130, and displays a reception message list on the display unit 151. When one of reception messages on the list displayed on the display unit 151 is selected by the user, the controller 180 displays the corresponding message on the display unit 151 as shown in FIG. 10.

At this time, when the display unit 151 is manipulated by the user, the controller 180 detects it via the sensing unit 140, and checks a placed state of the display unit 151 according to the manipulation. When the display unit 151 is determined to be in a reversed state, the controller makes the message symmetrical left and right so that the message can be displayed in a forward direction on the display unit 151. Namely, the controller properly outputs characters of the message without causing a state that the characters are reversed topsy turby or changed left and right, so that the user can properly check the information displayed on the display unit 151.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

The mobile terminal according to the embodiments of the present invention is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
    a display unit comprising a first side for displaying first information and a second side defined opposite to the first side for displaying second information;
    a sensing unit for detecting a physical state of the display unit; and
    a controller for:
        controlling the display unit to display the first information on the first side when the sensing unit detects that the first side faces a first direction that enables a user to view the first side; and
        controlling the display unit to display second information associated with the first information on the second side when the sensing unit detects that the display unit is rotated, while displaying the first information, such that the first side faces a second direction that does not enable the user to view the first side.

2. The mobile terminal of claim 1, wherein the display unit is a transparent organic light emitting element.

3. The mobile terminal of claim 1, wherein the sensing unit detects the physical state according to a direction that the first side faces.

4. The mobile terminal of claim 1, wherein the first information is an image and the second information is information associated with the image.

5. The mobile terminal of claim 1, wherein the first information is an image thumbnail gallery and the second information is a slide show of images included in the image thumbnail gallery.

6. The mobile terminal of claim 1, wherein the first information is a current time and the second information is a menu for adjusting information associated with the current time.

7. A display method of a mobile terminal comprising:
    detecting, via a sensing device, a physical state of a display device comprising a first side and a second side defined opposite to the first side;
    displaying first information on the first side when the sensing device detects that the first side faces a first direction that enables a user to view the first side; and
    displaying second information associated with the first information on the second side when the sensing unit detects that the display unit is rotated, while displaying the first information, such that the first side faces a second direction that does not enable the user to view the first side.

8. The method of claim 7, wherein the display device is a transparent organic light emitting element.

9. The method of claim 7, wherein detecting the physical state of the display device comprises:
    detecting a direction that the first side faces; and
    determining the physical state of the display device according to the detected direction.

10. The method of claim 7, wherein the first information is an image and the second information is information associated with the image.

11. The method of claim 7, wherein the first information is an image thumbnail gallery and the second information is a slide show of images included in the image thumbnail gallery.

12. The method of claim 7, wherein the first information is a current time and the second information is a menu for adjusting information associated with the current time.

* * * * *